(12) United States Patent
Shimizu

(10) Patent No.: US 7,907,056 B2
(45) Date of Patent: Mar. 15, 2011

(54) CONTACTLESS COMMUNICATION CIRCUIT AND PORTABLE TERMINAL

(75) Inventor: Kanjiro Shimizu, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 920 days.

(21) Appl. No.: 11/774,239

(22) Filed: Jul. 6, 2007

(65) Prior Publication Data

US 2008/0012712 A1    Jan. 17, 2008

(30) Foreign Application Priority Data

Jul. 14, 2006  (JP) ................. 2006-194092

(51) Int. Cl.
*G08B 13/18* (2006.01)
*H01Q 11/12* (2006.01)
(52) U.S. Cl. ................... 340/572.5; 343/742
(58) Field of Classification Search .......... 343/741, 343/742, 764, 702; 340/572.5, 572.7
See application file for complete search history.

(56) References Cited

U.S. PATENT DOCUMENTS

| 7,546,089 B2 * | 6/2009 | Bellantoni ............... 455/73 |
| 2005/0092836 A1 * | 5/2005 | Kudo ..................... 235/436 |
| 2006/0052055 A1 | 3/2006 | Rowse et al. |
| 2007/0046430 A1 * | 3/2007 | Yamazaki et al. ......... 340/10.1 |

FOREIGN PATENT DOCUMENTS

| EP | 1 560 149 A2 | 8/2005 |
| JP | 2001155120 A * | 6/2001 |
| JP | 2004-266729 | 9/2004 |
| WO | WO 2005/013506 A1 | 2/2005 |
| WO | WO 2006/054070 A1 | 5/2006 |

* cited by examiner

*Primary Examiner* — Shih-Chao Chen
(74) *Attorney, Agent, or Firm* — Oblon, Spivak, McClelland, Maier & Neustadt, L.L.P.

(57) ABSTRACT

The present invention provides a contactless communication circuit having both a contactless communication card function and a contactless communication reader/writer function, which includes a capacitor section that forms a parallel-resonant circuit with a contactless communication antenna; and a capacitance switching section that makes a capacitance of the capacitor section effective in a mode of the contactless communication card function, and reduces the capacitance of the capacitor section in a mode of the contactless communication reader/writer function.

13 Claims, 11 Drawing Sheets

CONTACTLESS COMMUNICATION CIRCUIT AND PORTABLE TERMINAL

BACKGROUND OF THE INVENTION

1. Field of the Invention

The present invention relates to a contactless communication circuit that transmits/receives signals through, e.g., so-called contactless communication, and a portable terminal having its contactless communication function.

2. Description of Related Art

Recently, contactless IC cards (hereinafter referred to as "RFID card(s)") incorporating an RFID (Radio Frequency-IDentification) circuit therein are gaining popularity as transportation tickets, prepaid cards and the like, thanks to their advantages, such as excellent usability, durability and maintainability, as well as simultaneous-access-to-multiple-cards capability.

Additionally, a portable telephone terminal incorporating such an RFID card has been marketed lately. By electronically transmitting/receiving money information between the RFID card incorporated in the portable telephone terminal and a contactless IC card reader/writer (hereinafter referred to as "RFID reader/writer") installed at, e.g., an automatic ticket gate or a checkout in a shop, a user can pay for a ticket or for a purchase at the shop, for example.

Furthermore, Published Japanese Patent Application No. 2004-307032 discloses a compact, lightweight portable terminal, which is a contactless RFID reader/writer type portable terminal, in which two or all of an antenna of the contactless RFID reader/writer, an antenna for communication with a host computer, and a coil for contactless recharging are jointly used, to make the portable terminal compact and lightweight.

SUMMARY OF THE INVENTION

By the way, technology for incorporating both an RFID card function and an RFID reader/writer function into a portable terminal such as a portable telephone terminal is under consideration recently.

If both RFID card and RFID reader/writer functions are thus incorporated into a portable terminal, contactless communication is to be carried out between the antenna of an RFID card provided in a portable terminal and the antenna of an external RFID reader/writer, or between the antenna of an RFID card provided in one of two portable terminals and the antenna of an RFID reader/writer of the other portable terminal, or between the antenna of a related art RFID card and the antenna of an RFID reader/writer provided in a portable terminal.

Here, in order to carry out contactless communication between an RFID card and an RFID reader/writer, loop antennas for implementing wireless communication by electromagnetic induction are needed. Additionally, it is necessary that these antennas of the RFID card and the RFID reader/writer are adjusted such that the antennas each are tuned into a predetermined frequency to optimize transmission characteristics therebetween.

However, if a contactless communication function is incorporated into a compact portable terminal such as a portable telephone terminal, it is unavoidable to arrange a loop antenna adjacent to the metal within the housing. In addition, if both RFID card and RFID reader/writer functions are incorporated into the compact portable terminal, the antenna of the RFID card and the antenna of the RFID reader/writer are disposed close to each other.

And the loop antenna arranged adjacent to the metal within the housing results in the one coupled with the metallic body, whereas the antennas of the RFID card and the RFID reader/writer disposed close to each other result in the one in which the antennas are likewise coupled with each other.

Namely, the antenna of the RFID card and the antenna of the RFID reader/writer are originally designed such that their resonant frequencies are adjusted in their respective free spaces. Therefore, if the antennas are coupled with the metallic body, or if the antennas are coupled with each other, their originally intended characteristics cannot be fully exhibited. And depending on the coupling condition, the resonant frequencies of the antennas shift to aggravate the phase shift between transmitted/received waveforms, even to reverse their phase at a certain point. Particularly, in an ASK (Amplitude Shift Keying) modulation scheme, it is arranged to implement communication through the data amplitudes of the composite waves of the transmitted/received waveforms. Thus, when the waveforms become out of phase with each other to a certain degree, the data amplitude is cancelled. Note that this cancel point is called "null" since communication is not established at this point.

Moreover, the RFID card has a plurality of specifications. Therefore, when the portable terminal is operating as the RFID reader/writer, the resonant frequency of an RFID card at the other end could be any of frequencies compliant with the plurality of specifications. For example, an RFID card capable of supporting anticollision, or an anticollision RFID card, has its resonant frequency set to a value higher than a carrier frequency, and hence it is required to increase its output level in order to ensure its communication distance.

Furthermore, when both RFID card and RFID reader/writer functions are incorporated into a portable terminal, resonant frequencies for causing a null and resonant frequencies for optimizing the communication distance differ for each function. Hence, tuning compatible with the characteristics of both functions becomes extremely complicated, making their designing extremely difficult.

Meanwhile, some typical solutions to these problems could be, e.g., to provide antennas and ICs independently for each function, devise the antenna configuration, use less metal in the housing, adhere a magnetic sheet, and so on. However, these solutions would impose restrictions on mechanical structure and terminal design considerations in designing a portable terminal such as a portable telephone terminal, with an additional rigidity problem, and thus are not practical.

The present invention has been made in view of the above and other problems, and provides a contactless communication circuit and a portable terminal, in which when both RFID card and RFID reader/writer functions are incorporated into the portable terminal such as a portable telephone terminal, structural and design restrictions are reduced, and satisfactory performance are ensured for both functions.

According to embodiments of the present invention, there are provided a contactless communication circuit and a portable terminal, each of which has both a contactless communication card function and a contactless communication reader/writer function, and includes a capacitor section and a capacitance switching section. The capacitor section forms a parallel-resonant circuit with a contactless communication antenna, and the capacitance switching section that makes a capacitance of the capacitor section effective in a mode of the contactless communication card function, and reduces the capacitance of the capacitor section in a mode of the contactless communication reader/writer function.

According to the embodiments of the present invention, there are also provided a contactless communication circuit and a portable terminal, each of which has both a contactless communication card function and a contactless communication reader/writer function, and includes a main antenna, a sub-antenna, a capacitor section, and a capacitance switching section. The main antenna is connected to a main circuit for contactless communication. The sub-antenna is coupled with the main antenna. The capacitor section forms a parallel-resonant circuit with the sub-antenna. The capacitance switching section makes a capacitance of the capacitor section effective in a mode of the contactless communication card function, and reduces the capacitance of the capacitor section in a mode of the contactless communication reader/writer function.

According to the embodiment of the present invention, there are still provided a contactless communication circuit and a portable terminal, each of which has at least a contactless communication reader/writer function, and includes a capacitor, a first field-effect transistor, a second field-effect transistor, and a control section. The capacitor is connected at one end thereof to one end of a contactless communication antenna. The first field-effect transistor is inserted between the other end of the capacitor and a ground. The second field-effect transistor is inserted between the other end of the contactless communication antenna and a ground. The control section turns on the first and second field-effect transistors when communicating with a contactless communication card capable of supporting anticollision (hereinafter, referred to as "anticollision contactless communication card"), and turns off the first and second field-effect transistors when communicating with a contactless communication card not supporting anticollision (hereinafter, referred to as "non-anticollision contactless communication card").

According to the embodiments of the present invention, there are still provided a contactless communication circuit and a portable terminal, each of which has at least a contactless communication reader/writer function, and includes a main antenna, a sub-antenna, a capacitor, a field-effect transistor, and a control section. The main antenna is connected to a main circuit for contactless communication. The sub-antenna is coupled with the main antenna. The capacitor forms a parallel-resonant circuit with the sub-antenna. The field-effect transistor is connected within the parallel-resonant circuit formed of the capacitor and the sub-antenna. The control section turns on the field-effect transistor when communicating with an anticollision contactless communication card, and turns off the field-effect transistor when communicating with a non-anticollision contactless communication card.

According to the embodiments of the present invention, there are also provided a contactless communication circuit and a portable terminal, each of which has at least a contactless communication reader/writer function, and includes a main antenna, a sub-antenna, a capacitor, a field-effect transistor, and a control section. The main antenna is connected to a main circuit for contactless communication. The sub-antenna is coupled with the main antenna. The capacitor forms a parallel-resonant circuit with the sub-antenna. The field-effect transistor is inserted between a ground and a node between the capacitor and the sub-antenna. The control section turns on the field-effect transistor when communicating with an anticollision contactless communication card, and turns off the field-effect transistor when communicating with a non-anticollision contactless communication card.

Namely, according to the present invention, at the time of switching between the contactless communication card function and the contactless communication reader/writer function, or at the time of switching of communication between an anticollision contactless communication card and cards of other types in the contactless communication reader/writer function, the capacitance of the capacitor section that forms the parallel-resonant circuit with the contactless communication antenna is made effective or is reduced, whereby to shift the resonant frequency.

DESCRIPTION OF THE EMBODIMENTS

An embodiment of the present invention will be described below with reference to the accompanying drawings.

Note that in the following description, a portable telephone terminal incorporating both an RFID card function and an RFID reader/writer function is taken as an example of a portable terminal according to an embodiment of the present invention to which a contactless communication circuit of the present invention is applied. It goes without saying that what is described herein is, of course, merely an example and thus that the present invention is not limited to this example.

[Basic Configuration]

First, before describing a specific circuit configuration according to the present invention, a basic structure of a contactless communication circuit having both RFID card and RFID reader/writer functions will be described with reference to FIG. 1 below.

Figure 1:
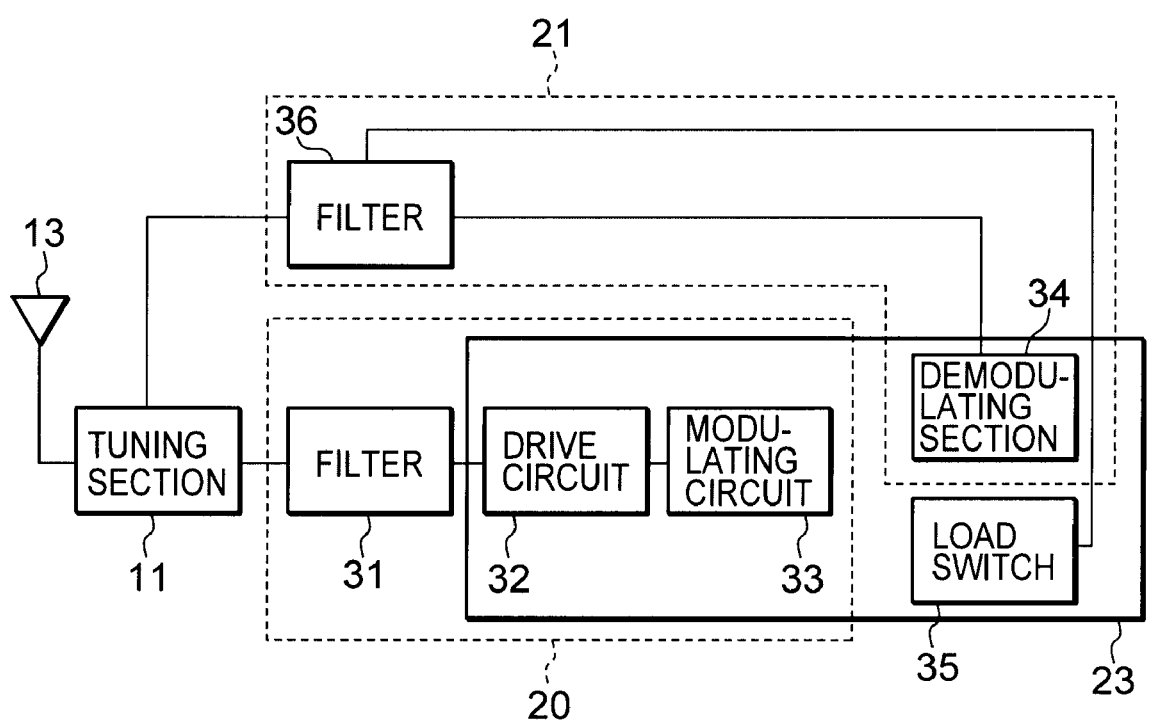
FIG. 1 is a block diagram showing a basic configuration example of a contactless communication circuit having both an RFID card function and an RFID reader/writer function.

In FIG. 1, a contactless communication circuit serving both as the RFID card and the RFID reader/writer has an antenna 13, a tuning section 11, a transmission block 20, a reception block 21, and an RFID LSI 23.

The antenna 13 may be formed of a single antenna for both transmission and reception, or of two antennas, one for transmission by an RFID reader/writer and the other for reception by the RFID reader/writer and an RFID card. Note that the antenna 13 is formed as a loop-shaped antenna.

The tuning section 11 is a circuit section for obtaining a resonant frequency of 13.56 MHz, which includes an inductive component of the antenna 13. Typically, the tuning section 11 has a configuration in which a capacitor is parallel-connected across the loop antenna being the antenna 13.

The transmission block 20 includes an MPU system, not shown, that realizes upper layers of a wireless communication protocol, a nonvolatile memory, not shown, for storing data and the like, a modulating circuit 33 that generates an ASK-modulated data on the basis of transmitted data from the MPU system, a drive circuit 32 that generates a waveform signal for transmission, responsive to the ASK-modulated data, a filter 31 for a transmission frequency band, and the like. Note that each circuit of the transmission block 20 may be built into a discrete semiconductor device or the like.

The reception block 21 includes an amplifier, not shown, for amplifying an ASK-modulated response waveform signal, transmitted thereto from an RFID card, a waveform shaping filter 36, a demodulating section 34 for extracting (demodulating) data from the received waveform signal, and the like. Also, the reception block 21 doubles as a circuit for extracting a clock from a carrier received from an RFID reader/writer.

The RFID LSI 23 is an LSI (Large-Scale Integrated circuit) incorporating therein the drive circuit 32, modulating circuit 33 and the like of the transmission block 20; and the demodulating section 34, clock extracting circuit, and the like of the reception block 21; and further a load switch 35 and the like.

The load switch 35 is an on/off switch used in an RFID card function mode. Namely, when a reply is to be returned to an RFID reader/writer, on/off switching of the load switch 35 is repeated for modulation such that the modulated waveform can be recognized as an impedance change at the antenna terminal of the RFID reader/writer, whereby it is configured to convey an amplitude difference in the ASK modulation scheme.

Configuration Example of First Embodiment

Figure 2:
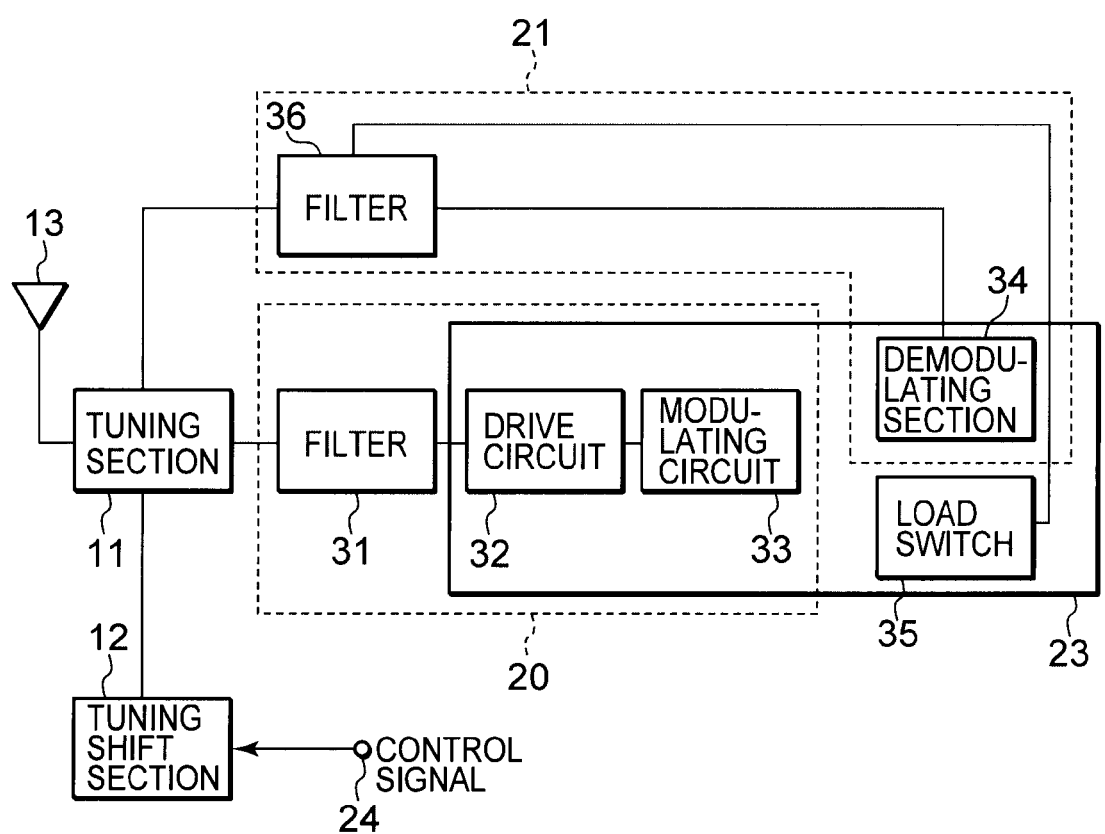
FIG. 2 is a block diagram showing a configuration example of a contactless communication circuit having both an RFID card function and an RFID reader/writer function, according to a first embodiment of the present invention.
Figure 3:
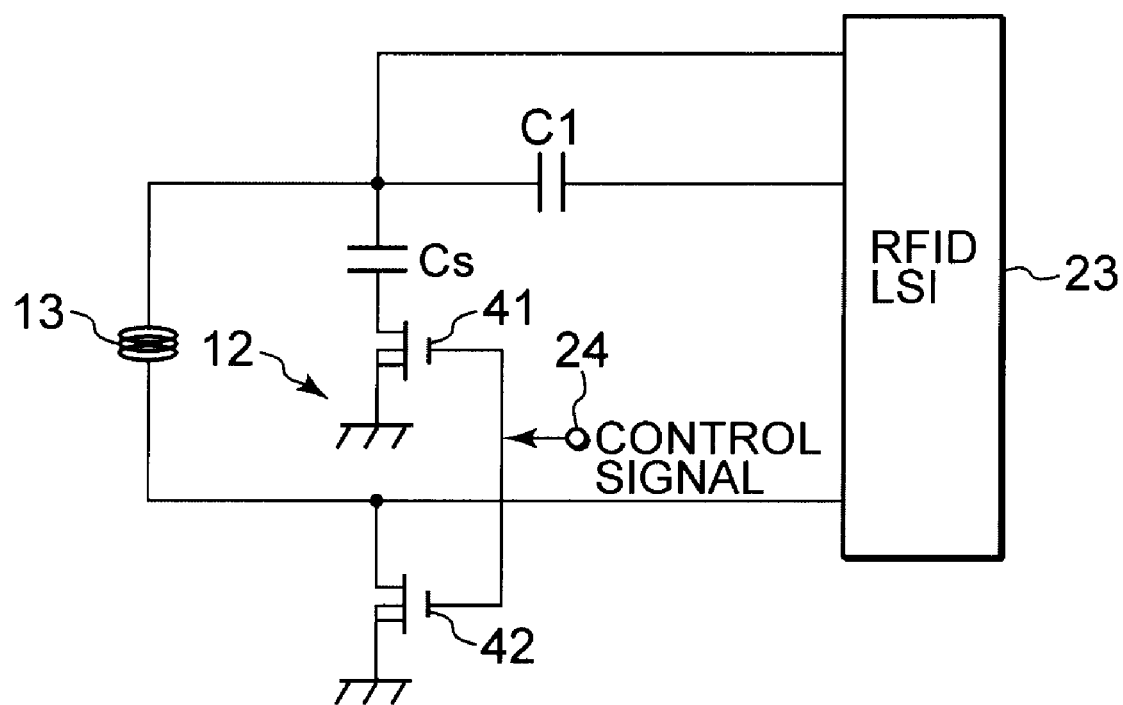
FIG. 3 is a circuit diagram showing a specific configuration example of a tuning shift section and the like used in the contactless communication circuit according to the first embodiment.

In FIGS. 2 and 3, a configuration example of a contactless communication circuit according to a first embodiment of the present invention is shown, in which satisfactory performance can be ensured for both RFID card and RFID reader/writer functions.

The contactless communication circuit according to the first embodiment is configured, as shown in FIG. 2, such that a tuning shift section 12 and a control signal for supply to the tuning shift section 12 are added to the basic configuration of FIG. 1. Note that in FIG. 2, the same parts as in the basic configuration shown in FIG. 1 are given the same reference symbols and that their descriptions will be omitted.

The tuning shift section 12 in the present embodiment has a circuit configuration such as shown in FIG. 3, as an example. Note that in FIG. 3, the antenna 13, RFID LSI 23, and a DC blocking capacitor C1 are also shown, in addition to the tuning shift section 12.

In this first embodiment, the tuning shift section 12 has, as shown in FIG. 3, a tuning capacitor Cs, first and second FETs (Field-Effect Transistors) 41, 42, and a terminal 24 for supplying a control signal to the gates of the first and second FETs 41, 42. Specifically, the tuning capacitor Cs of the tuning shift section 12 is connected at one end thereof to one end of the antenna 13 and at the other end thereof to the ground via the first FET 41. Furthermore, the second FET 42 is inserted between the other end of the antenna 13 and the ground. And in the configuration of FIG. 3, a control signal is supplied via the terminal 24 to gates of the first and second FETs 41, 42 from, e.g., a host CPU, not shown. The control signal is set to an "H" (high) level in the RFID card function mode (when an application for using the RFID card function is started) and to an "L" (low) level in an RFID reader/writer function mode (when an application for using the RFID reader/writer function is started).

Namely, according to the contactless communication circuit shown in the first embodiment, in the RFID card function mode, a control signal having a predetermined voltage of the "H" level is applied to the gates of the first and second FETs 41, 42 to turn their switches on, whereas in the RFID reader/writer function mode, a control signal having a predetermined voltage of the "L" level is applied to the gates of the first and second FETs 41, 42 to turn their switches off. It is configured such that the tuning capacitor Cs is directly controlled to switch resonant frequencies.

Configuration Example of Second Embodiment

In FIGS. 4 to 8, a configuration example of a contactless communication circuit according to a second embodiment of the present invention is shown, in which satisfactory performance can be ensured for both RFID card and RFID reader/writer functions.

Figure 4:
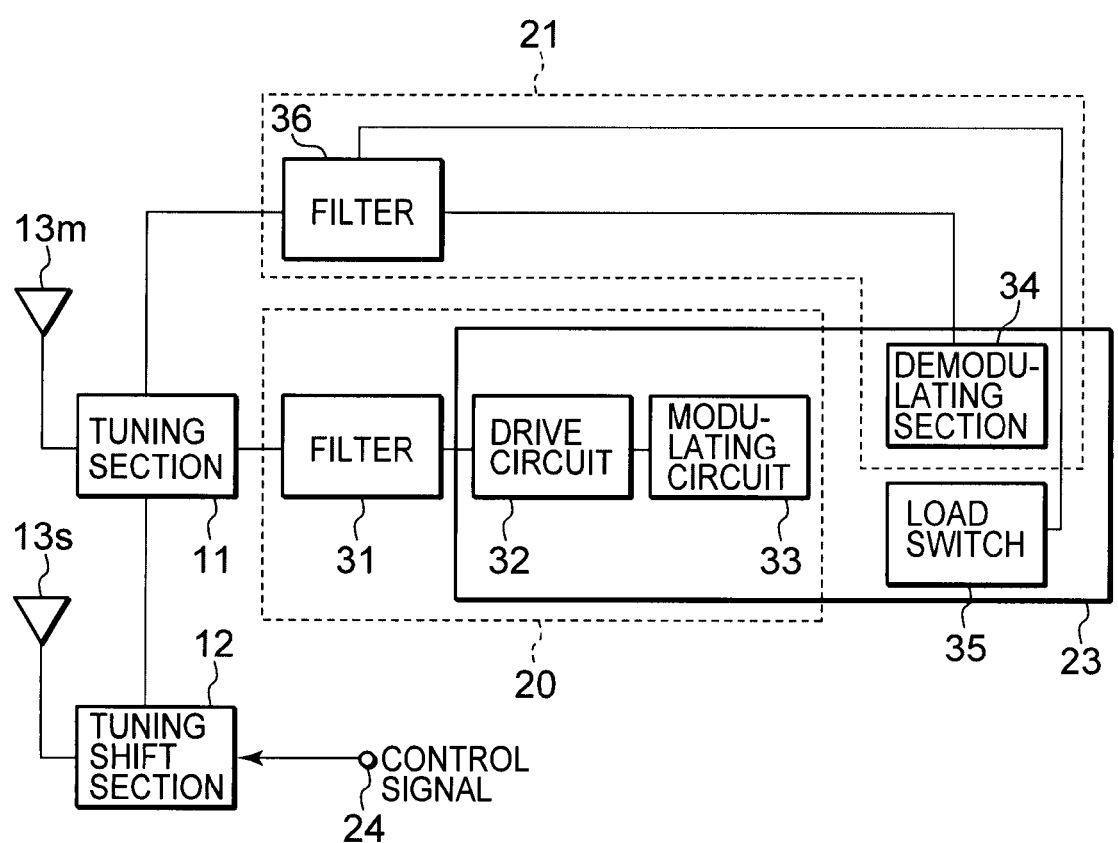
FIG. 4 is a block diagram showing a configuration example of a contactless communication circuit having both an RFID card function and an RFID reader/writer function, according to a second embodiment of the present invention.

The contactless communication circuit according to the second embodiment is configured, as shown in FIG. 4, such that a main antenna 13m and a sub-antenna 13s are provided as antennas, with the main antenna 13m connected to the tuning section 11 and with the sub-antenna 13s connected to the tuning shift section 12. Note that in FIG. 4, the same parts as in the basic configuration shown in FIG. 1 are given the same reference symbols and that their descriptions will be omitted.

Figure 5:
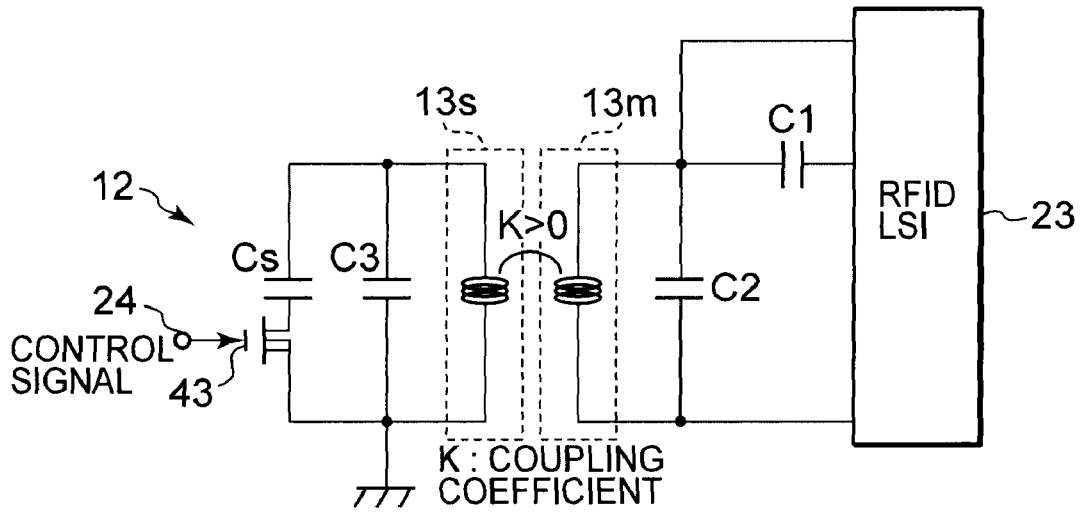
FIG. 5 is a circuit diagram showing a first specific configuration example of a tuning shift section and the like used in the contactless communication circuit according to the second embodiment.
Figure 6:
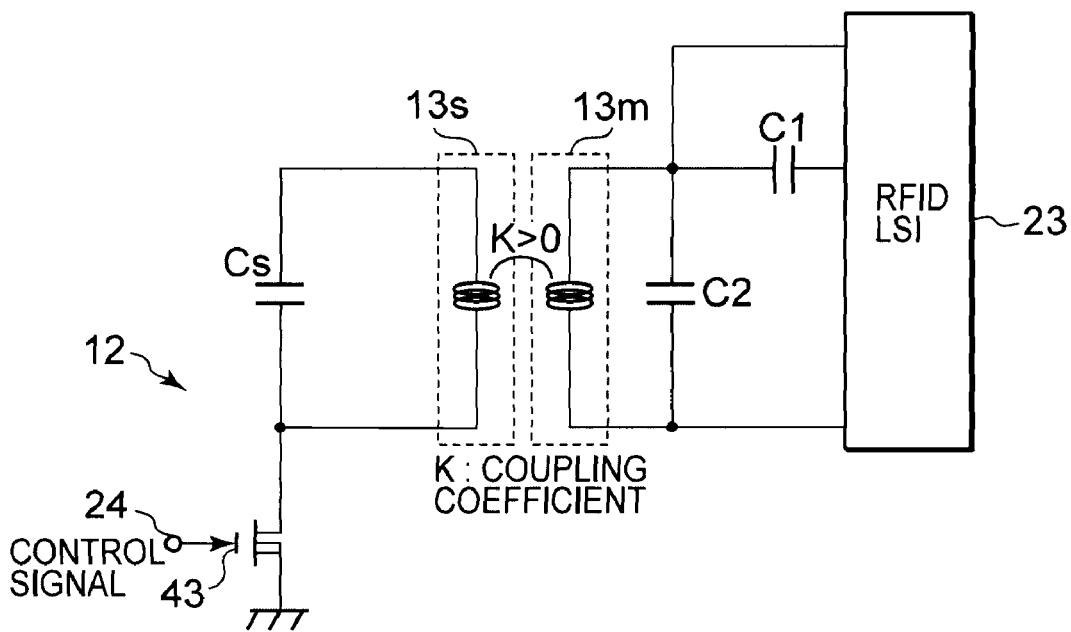
FIG. 6 is a circuit diagram showing a second specific configuration example of the tuning shift section and the like used in the contactless communication circuit according to the second embodiment.
Figure 7:
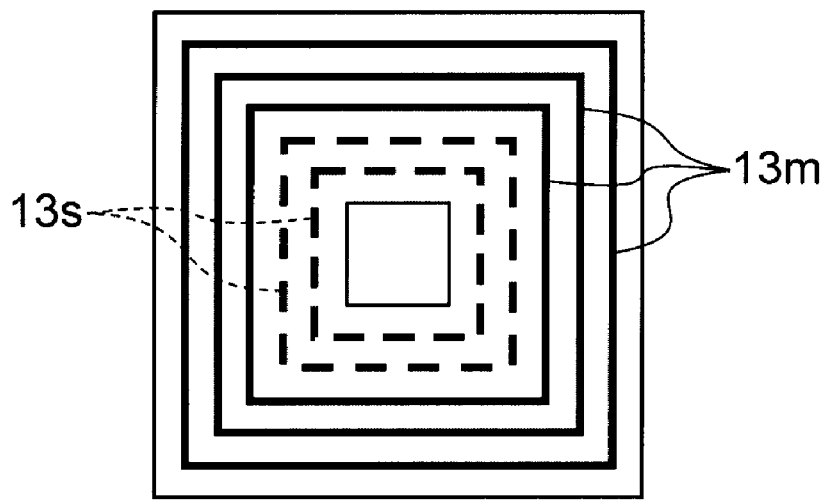
FIG. 7 is a diagram showing a specific example of a loop pattern for a main antenna and a sub-antenna.
Figure 8:
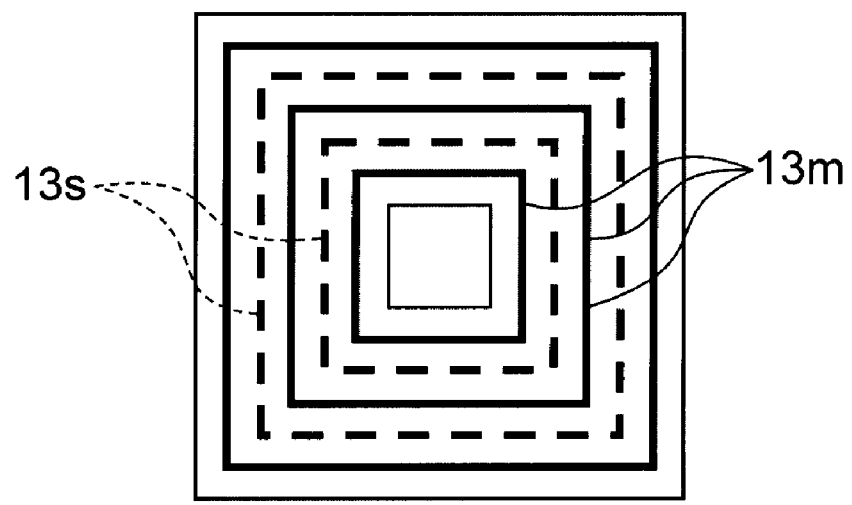
FIG. 8 is a diagram showing another specific example of the loop pattern for the main antenna and the sub-antenna.

The tuning shift section 12 in the present embodiment has a first specific circuit configuration example such as shown in FIG. 5, or a second specific circuit configuration example such as shown in FIG. 6. Note that in FIGS. 5, 6, the main antenna 13m, sub-antenna 13s, RFID LSI 23, DC blocking capacitor C1, a capacitor C2 for a resonant circuit with the main antenna 13m, and a capacitor C3 for a resonant circuit with the sub-antenna 13s are also shown, in addition to the tuning shift section 12.

First, the first specific circuit configuration example shown in FIG. 5 will be described.

In the first specific circuit configuration example shown in FIG. 5, the main antenna 13m and the sub-antenna 13s are magnetically coupled. Furthermore, the tuning shift section 12 has the tuning capacitor Cs, an FET 43, and the terminal 24 for supplying a control signal to the gate of the FET 43. Specifically, the tuning capacitor Cs and the FET 43 of the tuning shift section 12 in this first specific example are parallel-connected across the sub-antenna 13s. And in the configuration of FIG. 5, a control signal, which is set to the "H" level in the RFID card function mode and to the "L" level in the RFID reader/writer function mode, is supplied to the gate of the FET 43 via the terminal 24 from, e.g., the host CPU, not shown.

Namely, in the contactless communication circuit shown in the first specific example of this second embodiment, in the RFID card function mode, a control signal having a predetermined voltage of "H" level is applied to the gate of the FET 43 to turn its switch on, whereas in the RFID reader/writer function mode, a control signal having a predetermined voltage of "L" level is applied to the gate of the FET 43 to turn its switch off. This arrangement allows the tuning capacitor Cs of the sub-antenna 13s that is intimately coupled with the main antenna 13m to be directly controlled to switch resonant frequencies.

Next, the second specific circuit configuration example shown in FIG. 6 will be described.

In the second specific circuit configuration example shown in FIG. 6, the main antenna 13m and the sub-antenna 13s are magnetically coupled. Furthermore, in this second specific example, the tuning shift section 12 has the tuning capacitor Cs, the FET 43, and the terminal 24 for supplying a control signal to the gate of the FET 43. Specifically, the tuning capacitor Cs of the tuning shift section 12 in this second specific example is connected to the sub-antenna 13s in parallel, and further, a node between the tuning capacitor Cs and the sub-antenna 13s is connected to the ground via the FET 43. And in the configuration of FIG. 6, a control signal, which is set to the "H" level in the RFID card function mode and to the "L" level in the RFID reader/writer function mode, is supplied to the gate of the FET 43 via the terminal 24 from, e.g., the host CPU, not shown.

Namely, in the contactless communication circuit shown in the second specific example of this second embodiment, in the RFID card function mode, a control signal having a predetermined voltage of "H" level is applied to the gate of the FET 43 to turn its switch on, whereas in the RFID reader/writer function mode, a control signal having a predetermined voltage of "L" level is applied to the gate of the FET 43 to turn its switch off. This allows the sub-antenna 13s itself, which is intimately coupled with the main antenna 13m, to be directly controlled to switch resonant frequencies.

Note that the main antenna 13m and the sub-antenna 13s shown in the first and second specific examples of the second embodiment may be configured as follows. Namely, as shown in, e.g., FIG. 7, a loop-shaped pattern of the main antenna 13m is formed around the outer circumference, and a loop-shaped pattern of the sub-antenna 13c is formed around the inner circumference, or as shown in, e.g., FIG. 8, loops forming a loop-shaped pattern of the main antenna 13m alternate with loops forming a loop-shaped pattern of the sub-antenna 13s. These loop-shaped patterns of the main antenna 13m and the sub-antenna 13s are formed on, e.g., a single flexible board surface, glass epoxy board surface, a single inner wall of a housing, or the like. Alternatively, by forming a pattern of loops of the main antenna 13m on, e.g., a front surface of, e.g., a single double-sided flexible board and a pattern of loops of, e.g., the sub-antenna 13s on its bottom surface so as to overlap with the pattern on the front surface, whereby the loops can be arranged at narrow intervals in each pattern.

[Operation in RFID Card Function Mode and RFID Reader/Writer Function Mode]

Operation performed to realize the RFID card function and the RFID reader/writer function by the contactless communication circuits according to the first and second embodiments will be described below.

In the RFID card function mode, the control signal having the predetermined voltage of "H" level is applied to the gate of each of the above-mentioned FETs (the FETs 41 and 42, or the FET 43), to turn on the switch of the FET. In this case, the capacitance of the tuning capacitor Cs connected in parallel to the antenna (the antenna 13 or the sub-antenna 13s) becomes effective, whereby a parallel-resonant circuit is formed. Here, as shown in a formula (1), since a resonant frequency f0 is determined mainly by the values of an inductance L and a capacitance C, all the capacitances C become effective as a combined capacitance when the FET is switched on. In each embodiment of the present invention, the resonant frequency f0 is adjusted to be 13.56 MHz under this condition.

$$f0 = \frac{1}{2\pi\sqrt{LC}} \quad (1)$$

Figure 9:
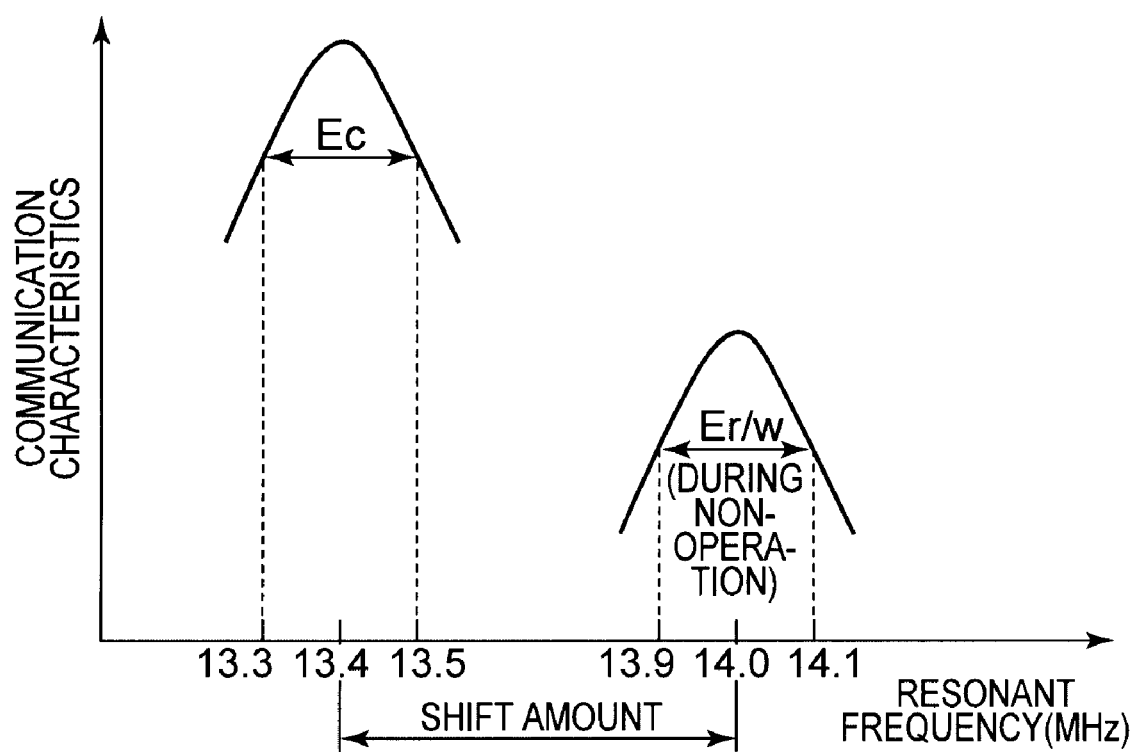
FIG. 9 is a diagram showing an image of allowable frequency bands for the RFID card function and the RFID reader/writer function.

In FIG. 9, an image of allowable frequency bands for the RFID card function and for the RFID reader/writer function (during nonoperation) are shown, with the vertical axis indicating communication characteristics and the horizontal axis indicating the resonant frequency. As shown in FIG. 9, in the RFID card function mode, the resonant frequency needs to be set to a value slightly lower than 13.56 MHz being the carrier frequency, in order to satisfy performance for various external RFID readers/writers. An arrow Ec in FIG. 9 indicates a range within which performance is satisfied in the RFID card function, whereas an arrow Er/w indicates a range within which performance is satisfied in the RFID reader/writer function. Note that the resonant frequency for the RFID reader/writer function is supposed to be a value during nonoperation. As seen from the figure, the frequency bands that can satisfy performance for these functions are not the same, and thus neither of the frequency bands can be shared between both functions.

Figure 10:
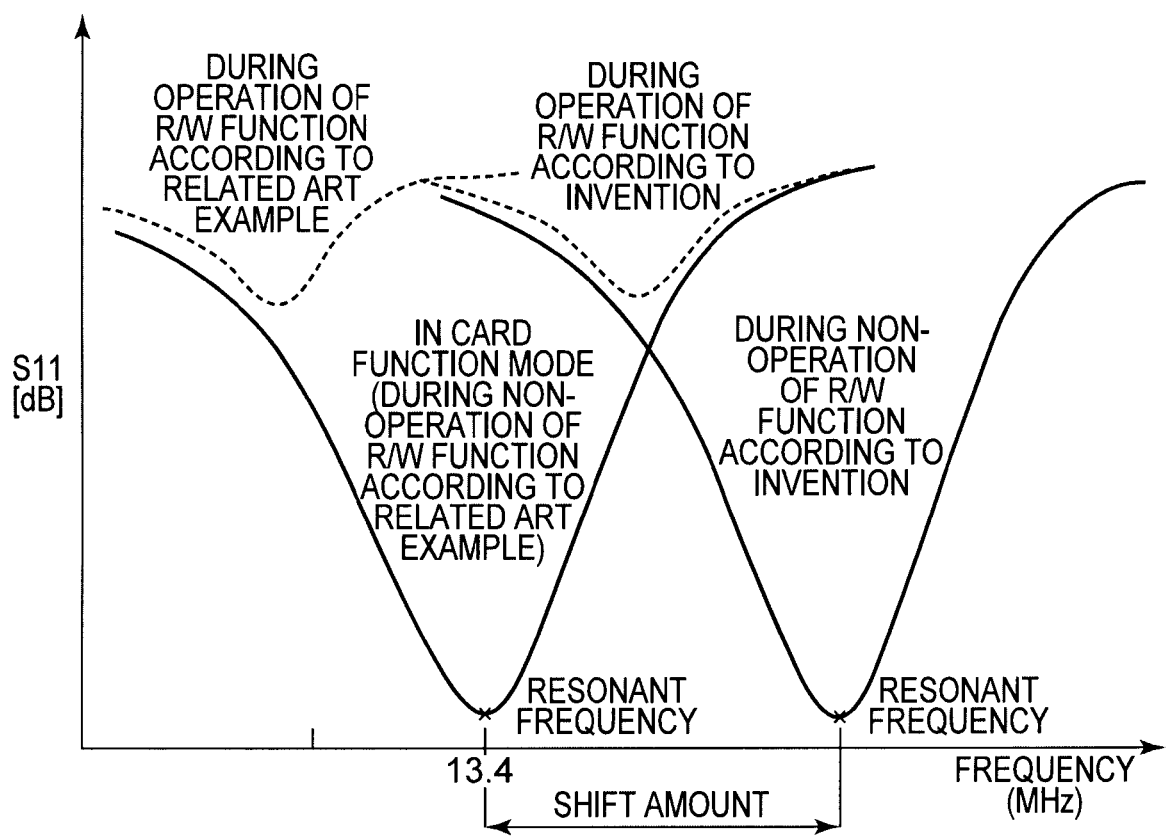
FIG. 10 is a diagram for explaining a state in which a balance in a parallel resonant circuit is broken in an RFID reader/writer function mode to shift the resonant frequency to a lower level.

Furthermore, a reason why the resonant frequency for the RFID reader/writer function is high is that the RFID LSI 23 used for the contactless communication circuits according to the embodiments of the present invention is specified such that its input impedance is switched to a high level in the RFID card function mode and to a lower level during operation of the RFID reader/writer function than in the RFID card function mode. For this reason, during operation of the RFID reader/writer function during which the input impedance of the RFID LSI 23 is low, the parallel-resonant circuit becomes off-balanced, as shown in FIG. 10, whereby the resonant frequency shifts to a lower level. Namely, in order to satisfy the performance of the RFID reader/writer function, it is necessary to preset the resonant frequency to a level higher than in the RFID card function mode.

Here, as shown in FIG. 9, in order to satisfy both the communication distance and null characteristics simultaneously during operation of the RFID reader/writer function, it is necessary to set the resonant frequency to a value higher than 13.56 MHz. Namely, in order to ensure performance in the RFID reader/writer function mode, it is necessary to shift the resonant frequency to a higher value in the RFID reader/writer function mode. An amount by which the resonant frequency is to be shifted is, as shown in FIGS. 9 and 10, equal to a difference between a predetermined resonant frequency (e.g., 13.4 MHz) within the range Ec for the RFID card function and a predetermined resonant frequency (e.g., 14.0 MHz) within the corresponding range Er/w of the RFID reader/writer function.

Thus, in the first and second embodiments of the present invention, in the RFID reader/writer function mode, by controlling to set the gate of each of the above-mentioned FETs (the FET 41 and 42, or the FET 43) to the "L" level and to turn off the FET series-connected with the tuning capacitor Cs, the capacitance of the tuning capacitor Cs parallel-connected across the antenna (the antenna 13, or the sub-antenna 13s) is made apparently ineffective, to reduce the combined capacitance of the capacitive components C of the parallel-resonant circuit to shift the resonant frequency to a higher value. Namely, as shown in FIG. 10, during operation of the RFID reader/writer function, the resonant frequency equals a value slightly higher than 13.56 MHz.

According to the contactless communication circuits of the embodiments of the present invention, by performing control such that the capacitance of the tuning capacitor Cs connected in parallel to the antenna is switched to shift the resonant frequency for the RFID reader/writer function as mentioned above, whereby desired performance shown in FIG. 9 can be realized for both the RFID card and RFID reader/writer functions, as shown in FIG. 10.

Third Embodiment

In addition to the use for switching the resonant frequencies responsive to a function used, such as during use of the RFID card function and during use of the RFID reader/writer function as in the above-described first and second embodiments, the present invention may be configured to switch the resonant frequencies for each RFID card at the other end of communication. Namely, in a third embodiment of the present invention, the resonant frequencies can be switched for each application used in response to a type of RFID card at the other end of the communication.

Figure 11:
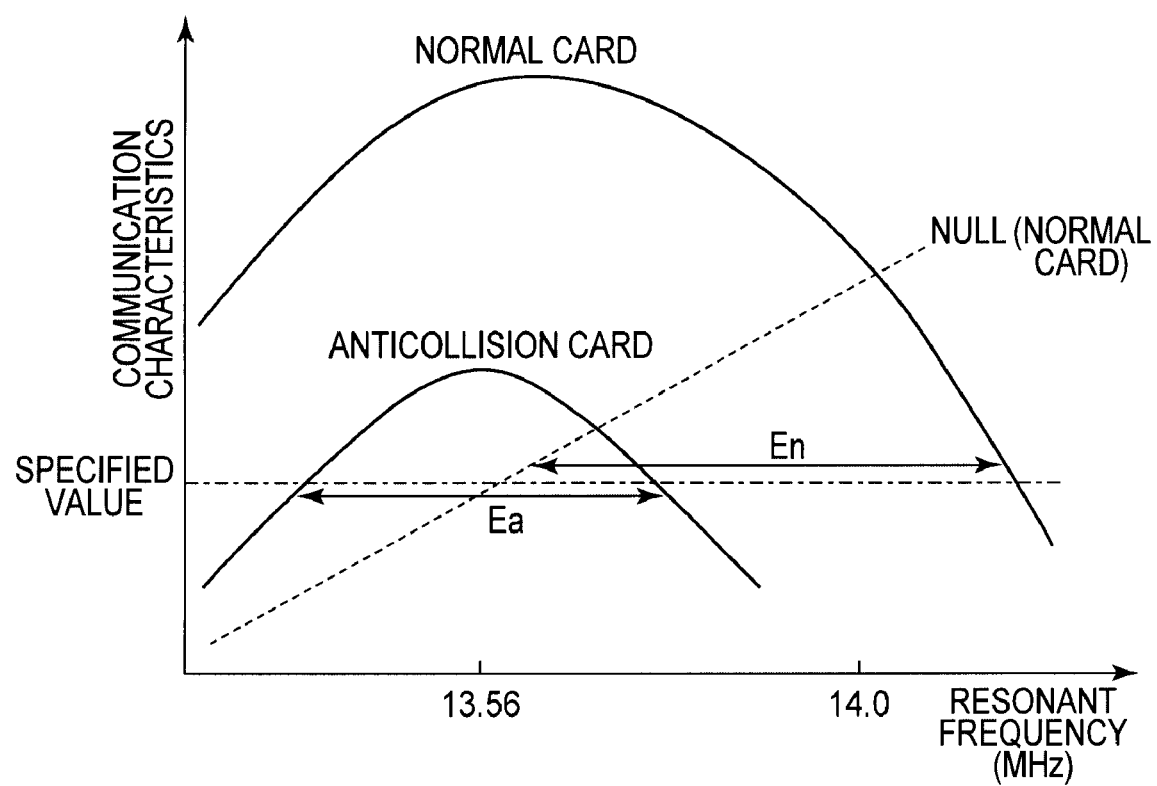
FIG. 11 is a diagram showing an image of allowable frequency bands for each of applications used in the RFID reader/writer function mode.

Specifically, as shown in FIG. 11, when an application for implementing communication with, e.g., an anticollision RFID card which support anticollision (hereinafter called "anticollision card") is used, the resonant frequency is set to a low value in order to ensure predetermined communication distance characteristics. Meanwhile, when an application for implementing communication with a normal RFID card which does not support anticollision (hereinafter called "normal card") is used, the resonant frequency is set to a high value in order to avoid nearby nulls since they are easy to occur at low frequencies. Note that FIG. 11 shows an image of allowable frequency bands for each application used in the RFID reader/writer function mode, with the vertical axis indicating the communication characteristics and the horizontal axis indicating the resonant frequency. An arrow Ea in FIG. 11 indicates a range within which performance is satisfied during use of the application for anticollision cards, whereas an arrow En indicates a range within which performance is satisfied during use of the application for normal cards.

Namely, the frequency bands that satisfy performance both during use of the application for anticollision cards and during use of the application for normal cards do not overlap, or overlap but only narrowly. Hence, even in this third embodiment, similarly to the switching of the RFID card function and the RFID reader/writer function in the earlier-mentioned first and second embodiments, by switching the resonant frequencies by on/off control of the FET(s), the performance can be satisfied during use of each application.

Note that in this third embodiment, the host CPU determines whether the application to be used is for anticollision cards or for normal cards, and in response to the determination result, it further determines whether the "H" level or the "L" level is set to the control signal.

Figure 12:
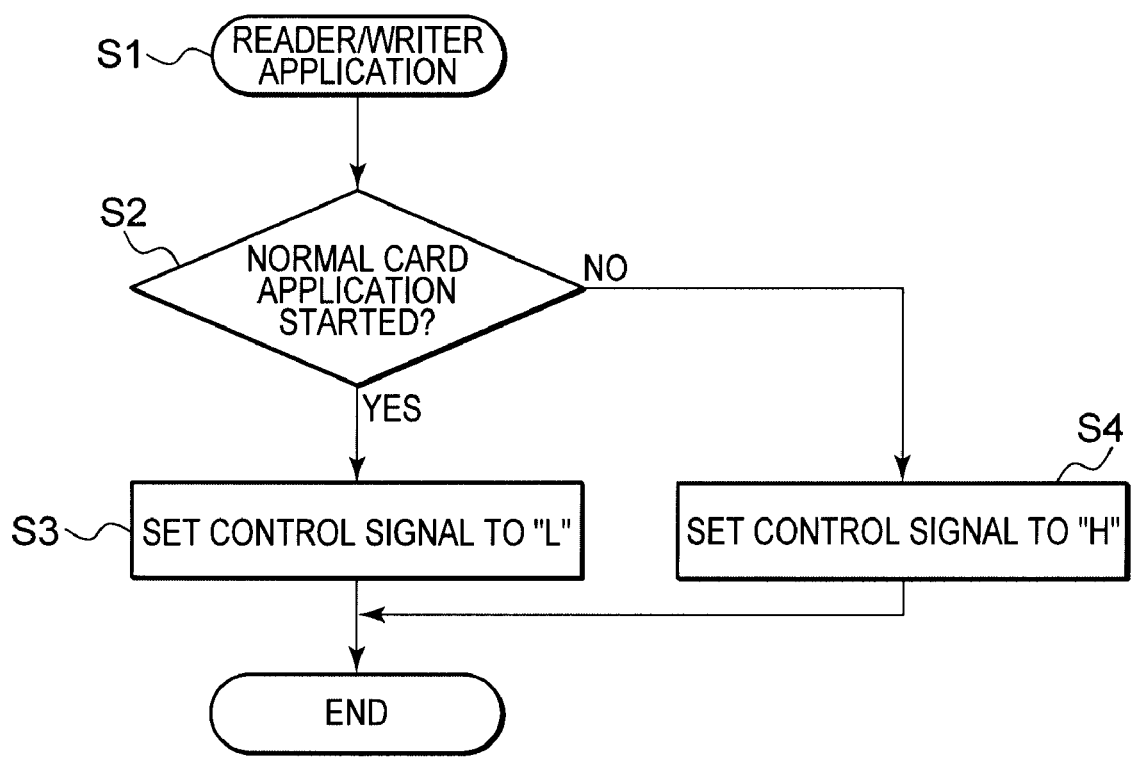
FIG. 12 is a flowchart according to which a host CPU determines the "H" or "L" level of a control signal responsive to a started application.

FIG. 12 is a flowchart for explaining how the host CPU determines the "H" level or the "L" level of the control signal.

In FIG. 12, when the application for using the RFID reader/writer function is started in step S1, the host CPU determines whether the started application is for normal cards, as step S2.

Then, if it is determined in step S2 that the application is for normal cards, the process goes to step S3 where the host CPU sets the control signal to the "L" level. If it is determined that the application is not for normal cards (it is for anticollision cards), the process to step S4 where the host CPU sets the control signal to the "H" level.

[Configuration of Portable Telephone Terminal]

Figure 13:
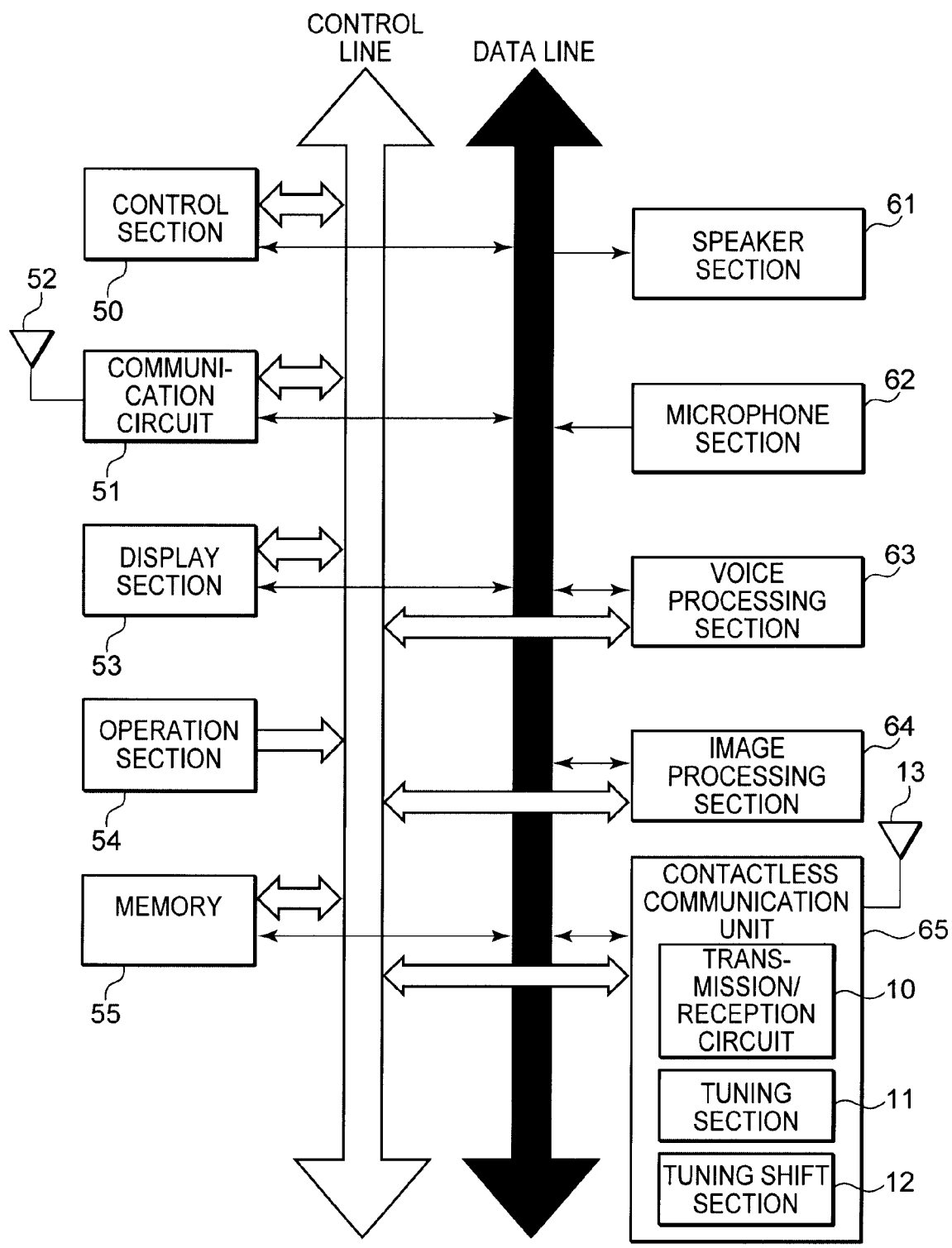
FIG. 13 is a block diagram showing a schematic internal circuit configuration of a portable telephone terminal incorporating the contactless communication circuit according to any of the embodiments of the present invention.

In FIG. 13, there is shown a schematic internal configuration of a portable telephone terminal incorporating the contactless communication circuit according to any of the embodiments of the present invention.

In FIG. 13, a communication antenna 52 is, e.g., a built-in antenna, and performs transmission and reception of signal waves for telephone conversation and packet communication. A communication circuit 51 performs frequency conversion, modulation, demodulation, and the like for transmission/reception signals. Conversation data received through the communication antenna 52 and the communication circuit 51 is delivered to a voice processing section 63 via a data line, and other received data is temporarily fed to a control section 50 for processing, and then delivered to various sections from the control section 50 as necessary.

The voice processing section 63 decodes, when conversation data is supplied thereto from the communication antenna 52 and the communication circuit 51, the conversation data, and delivers the decoded conversation data to a speaker section 61 via the data line.

The speaker section 61 is a speaker for listening conversations, and for ringers (ringing tones), playback of music and the like, provided at the portable telephone terminal. The speaker section 61 includes a digital-to-analog converter and an amplifier, and A/D-converts data, such as a conversation, a ringer tone, and music for playback, and amplifies the resultant digital data for output. As a result, the conversation, the ringer tone, and the music under playback can be obtained.

A microphone section 62 is a microphone for transmitting conversations and picking up external sounds, and includes an analog-to-digital converter and an amplifier. A voice signal inputted via this microphone section 62 is amplified to a predetermined level by the amplifier, then converted into digital voice data by the analog-to-digital converter, and further delivered to the voice processing section 63 via the data line for encoding. Then, the encoded signal is fed to the communication circuit 51 via the data line for various processing such as modulation and frequency conversion, and then sent from the communication antenna 52.

A display section 53 includes a display device such as, e.g., a liquid crystal display, and a display driving circuit for the display, and displays images, characters, various messages, and the like on the display.

An image processing section 64 performs, when compressed/encoded image data read from a built-in memory or from an external memory via an external memory interface, not shown, is supplied thereto, processing for playback such as the expanding/decoding of the image data, and delivers the expanded/decoded image data to the display section 53 via the data line.

An operation section 54 has operation buttons and an operation signal generator. The operation buttons include various keys such as numeric keys, a talk key, an end/power key, a cross key, and a jog dial. The operation signal generator generates an operation signal when an operation button is operated.

A contactless communication section 65 corresponds to the contactless communication circuit in each of the earlier-described embodiments of the present invention, and has a transmission/reception circuit 10 including the earlier-described transmission block 20, reception block 21, tuning section 11, tuning shift section 12 and the like, and implements contactless communication with other RFID cards and RFID readers/writers via the antenna 13.

A memory 55 includes a ROM (Read Only Memory) and a RAM (Random Access Memory). The ROM stores an OS (Operating System); control programs by which the control section 50 controls various other sections, and various initial settings; font data and various dictionary data; program codes of applications used for contactless communication; program codes for generating the earlier-mentioned control signal, and program codes of various applications incorporated in a typical portable telephone terminal; ID information about the portable telephone terminal; and other information. The ROM also includes a rewritable ROM such as a so-called NAND-type flash memory. In the rewritable ROM, there may be saved, e.g., e-mail data, phone book data, schedule data, memo pad data, image data and music data, ring tones, alarm sound data, character data, learned data, program codes of applications which are, e.g., downloaded, and various other settings and the like. The RAM stores data whenever necessary, as a working area used when the control section 50 performs various data processing.

The control section 50 performs various control, such as communication control in the communication circuit 51, display control of the display, writing/reading control of the memory, voice and image processing control, and further, control over various components of the portable telephone terminal and various computation processing. Particularly, in the present embodiment, the control section 50 also performs processing as the earlier-mentioned host CPU that that generates control signals for performing resonant frequency switching control between the RFID card function mode and in the RFID reader/writer function mode, and for performing the resonant frequency switching control responsive to an application used in the RFID reader/writer function mode.

Additionally, although not shown in FIG. 13, the portable telephone terminal according to the embodiments of the present invention has various components provided in a typical portable telephone terminal, such as a GPS function for position measurement, a camera function for imaging and the like, a clock function for generating date/time and other information and measuring time, a memory interface section to which an external memory is connected, a cable connector section to which an external cable is connected, an LED (Light Emitting Diode) for illuminating the keys or serving as a call alerting light and its driving section, a vibrator and its driving section, a battery for supplying power to the various sections and a power management IC section for control of the power of the battery, and an electronic wallet section that stores information for so-called electronic money and performs signal transmission/reception processing.

CONCLUSION

As described in the foregoing, according to the embodiments of the present invention, the resonant frequency can be corrected to an optimal value for either during use of the RFID card function and during use of the RFID reader/writer function, or for each RFID card application in the RFID reader/writer function mode. Therefore, satisfactory performance can be ensured both in the RFID card function and the RFID reader/writer function, or for each RFID card application in the RFID reader/writer function mode. Particularly, according to the present embodiments, the resonant frequencies are switchable depending on a control signal, which means that satisfactory performance can be accomplished systemwise. Hence, restrictions in antenna and mechanical configurations and other design-related considerations are reduced, which may permit realization of a higher degree of freedom in design.

Note that what is descried above as the embodiments is an example of the present invention. Thus, the present invention is not limited to these embodiments, but can, of course, be modified in various ways according to design and other considerations without departing from the technical idea of the present invention.

For example, the portable terminal of the present invention may be applicable also to PDA (Personal Digital Assistant) devices, notebook personal computers, portable electronic game machines, and the like, all having both the RFID card function and the RFID reader/writer function. Furthermore, the resonant frequencies switchable in the present invention are not limited to two frequency levels such as mentioned above, but may include three or more frequency levels. Likewise, the RFID card applications are not limited to the applications for anticollision cards and normal cards mentioned above.

In the present invention, the capacitance of the capacitor section that forms the parallel-resonant circuit with the contactless communication antenna is made effective or reduced to switch the resonant frequencies. As a result, when both RFID card and RFID reader/writer functions are incorporated into, e.g., a portable terminal such as a portable telephone terminal, structural and design restrictions are reduced and satisfactory performance can be ensured for both of these functions.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2006-194092 filed in the Japanese Patent Office on Jul. 14, 2006, the entire contents of which being incorporated herein by reference.

What is claimed is:

1. A contactless communication circuit having both a contactless communication card function and a contactless communication reader/writer function, comprising:
   a capacitor section that forms a parallel-resonant circuit with a contactless communication antenna; and
   a capacitance switching section that makes a capacitance of the capacitor section effective in a mode of the contactless communication card function, and reduces the capacitance of the capacitor section in a mode of the contactless communication reader/writer function.

2. The contactless communication circuit according to claim 1, wherein:
   the capacitor section is a capacitor connected at one end thereof to one end of the contactless communication antenna, and the capacitance switching section has:
a first field-effect transistor inserted between the other end of the capacitor and a ground,
a second field-effect transistor inserted between the other end of the contactless communication antenna and a ground, and
a control section that turns on the first and second field-effect transistors in the mode of the contactless communication card function and turns off the first and second field-effect transistor in the mode of the contactless communication reader/writer function.

3. A contactless communication circuit having both a contactless communication card function and a contactless communication reader/writer function, comprising:
a main antenna connected to a main circuit for contactless communication;
a sub-antenna coupled with the main antenna;
a capacitor section that forms a parallel-resonant circuit with the sub-antenna; and
a capacitance switching section that makes a capacitance of the capacitor section effective in a mode of the contactless communication card function, and reduces the capacitance of the capacitor section in a mode of the contactless communication reader/writer function.

4. The contactless communication circuit according to claim 3, wherein:
the capacitor section is a capacitor that forms the parallel-resonant circuit with the sub-antenna, and
the capacitance switching section has:
a field-effect transistor connected within the parallel-resonant circuit formed of the capacitor and the sub-antenna, and
a control section that turns on the field-effect transistor in the mode of the contactless communication card function and turns off the field-effect transistor in the mode of the contactless communication reader/writer function.

5. The contactless communication circuit according to claim 3, wherein:
the capacitor section is a capacitor that forms the parallel-resonant circuit with the sub-antenna, and
the capacitance switching section has:
a field-effect transistor inserted between a ground and a node between the capacitor and the sub-antenna, and
a control section that turns on the field-effect transistor in the mode of the contactless communication card function and turns off the field-effect transistor in the mode of the contactless communication reader/writer function.

6. A contactless communication circuit having at least a contactless communication reader/writer function, comprising:
a capacitor connected at one end thereof to one end of a contactless communication antenna;
a first field-effect transistor inserted between the other end of the capacitor and a ground;
a second field-effect transistor inserted between the other end of the contactless communication antenna and a ground; and
a control section that turns on the first and second field-effect transistors when communicating with an anticollision contactless communication card, and turns off the first and second field-effect transistors when communicating with a non-anticollision contactless communication card.

7. A contactless communication circuit having at least a contactless communication reader/writer function, comprising:
a main antenna connected to a main circuit for contactless communication;
a sub-antenna coupled with the main antenna;
a capacitor that forms a parallel-resonant circuit with the sub-antenna;
a field-effect transistor connected within the parallel-resonant circuit formed of the capacitor and the sub-antenna; and
a control section that turns on the field-effect transistor when communicating with an anticollision contactless communication card, and turns off the field-effect transistor when communicating with a non-anticollision contactless communication card.

8. A contactless communication circuit having at least a contactless communication reader/writer function, comprising:
a main antenna connected to a main circuit for contactless communication;
a sub-antenna coupled with the main antenna;
a capacitor that forms a parallel-resonant circuit with the sub-antenna;
a field-effect transistor inserted between a ground and a node between the capacitor and the sub-antenna; and
a control section that turns on the field-effect transistor when communicating with an anticollision contactless communication card, and turns off the field-effect transistor when communicating with a non-anticollision contactless communication card.

9. A portable terminal having both a contactless communication card function and a contactless communication reader/writer function, comprising:
a capacitor section that forms a parallel-resonant circuit with a contactless communication antenna;
a capacitance switching section that switches a capacitance of the capacitor section; and
a control section that controls the capacitance switching section to make the capacitance of the capacitor section effective in a mode of the contactless communication card function, and controls the capacitance switching section to reduce the capacitance of the capacitor section in a mode of the contactless communication reader/writer function.

10. A portable terminal having both a contactless communication card function and a contactless communication reader/writer function, comprising:
a main antenna connected to a main circuit for contactless communication;
a sub-antenna coupled with the main antenna;
a capacitor section that forms a parallel-resonant circuit with the sub-antenna;
a capacitance switching section that switches a capacitance of the capacitor section; and
a control section that controls the capacitance switching section to make the capacitance of the capacitor section effective in a mode of the contactless communication card function, and controls the capacitance switching section to reduce the capacitance of the capacitor section in a mode of the contactless communication reader/writer function.

11. A portable terminal having at least a contactless communication reader/writer function, comprising:
a capacitor connected at one end thereof to one end of a contactless communication antenna;

a first field-effect transistor inserted between the other end of the capacitor and a ground;

a second field-effect transistor inserted between the other end of the contactless communication antenna and a ground; and a control section that turns on the first and second field-effect transistors when communicating with an anticollision contactless communication card, and turns off the first and second field-effect transistors when communicating with a non-anticollision contactless communication card.

12. A portable terminal having at least a contactless communication reader/writer function, comprising:

a main antenna connected to a main circuit for contactless communication;

a sub-antenna coupled with the main antenna;

a capacitor that forms a parallel-resonant circuit with the sub-antenna;

a field-effect transistor connected within the parallel-resonant circuit formed of the capacitor and the sub-antenna; and a control section that turns on the field-effect transistor when communicating with an anticollision contactless communication card, and turns off the field-effect transistor when communicating with a non-anticollision contactless communication card.

13. A portable terminal having at least a contactless communication reader/writer function, comprising:

a main antenna connected to a main circuit for contactless communication;

a sub-antenna coupled with the main antenna;

a capacitor that forms a parallel-resonant circuit with the sub-antenna;

a field-effect transistor inserted between a ground and a node between the capacitor and the sub-antenna; and a control section that turns on the field-effect transistor when communicating with an anticollision contactless communication card, and turns off the field-effect transistor when communicating with a non-anticollision contactless communication card.

\* \* \* \* \*